No. 679,642. Patented July 30, 1901.
G. L. SLATER & A. W. ROE.
COIN CONTROLLED APPARATUS.
(Application filed Aug. 8, 1899.)

(No Model.) 4 Sheets—Sheet 1.

No. 679,642. Patented July 30, 1901.
G. L. SLATER & A. W. ROE.
COIN CONTROLLED APPARATUS.
(Application filed Aug. 8, 1899.)
(No Model.) 4 Sheets—Sheet 2.

Witnesses:
H. S. Austin,
James R. Mansfield.

Inventors:
George L. Slater
and Arthur W. Roe.
By Alexander & Dowell
Attorneys

No. 679,642. Patented July 30, 1901.
G. L. SLATER & A. W. ROE.
COIN CONTROLLED APPARATUS.
(Application filed Aug. 8, 1899.)

(No Model.) 4 Sheets—Sheet 3.

Witnesses:
H. S. Austin.
James R. Mansfield.

Inventors:
George L. Slater
and Arthur W. Roe
By Alexander & Dowell
Attorneys.

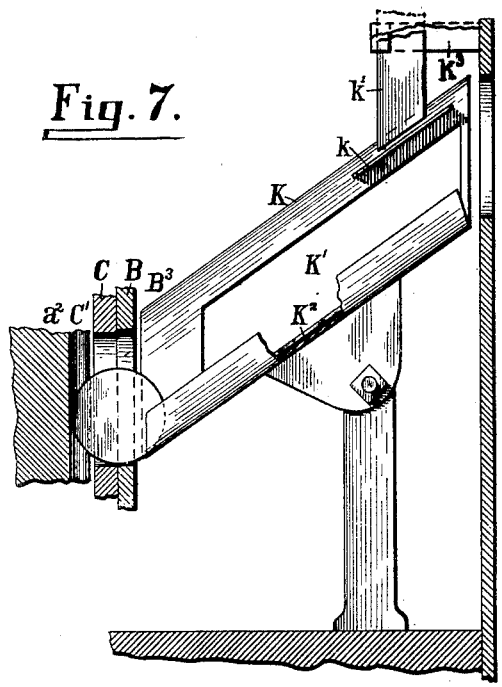
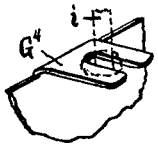
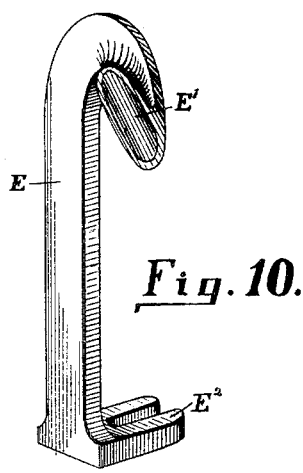
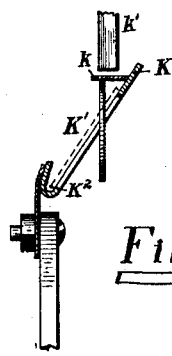

UNITED STATES PATENT OFFICE.

GEORGE L. SLATER AND ARTHUR W. ROE, OF BUCHANAN, MICHIGAN.

COIN-CONTROLLED APPARATUS.

SPECIFICATION forming part of Letters Patent No. 679,642, dated July 30, 1901.

Application filed August 8, 1899. Serial No. 726,612. (No model.)

*To all whom it may concern:*

Be it known that we, GEORGE L. SLATER and ARTHUR W. ROE, of Buchanan, Berrien county, Michigan, have invented certain new and useful Improvements in Coin-Controlled Apparatus; and we hereby declare that the following is a full, clear, and exact description thereof, reference being had to the accompanying drawings, which form part of this specification.

This invention is an improvement in automatic coin-controlled vending apparatus; and its object is to provide an improved device whereby the deposit of a coin in the slot will act as a key and enable the depositor by operating a crank or a lever to cause the mechanism to discharge a proper quantity of the goods from the machine.

The objects of the invention are to provide improved means for preventing dishonest parties robbing the machine by substituting metallic washers or slugs for coins; to use a coin as a key, whereby the prime mover is enabled to operate the discharging device; to prevent the return of the discharging device until it has been completely moved, and to close the coin-slots when the supply of commodities in the machine is exhausted.

To these ends the invention consists in the novel constructions and combinations of parts hereinafter claimed and described, and illustrated in the accompanying drawings, in which—

Figure 1:
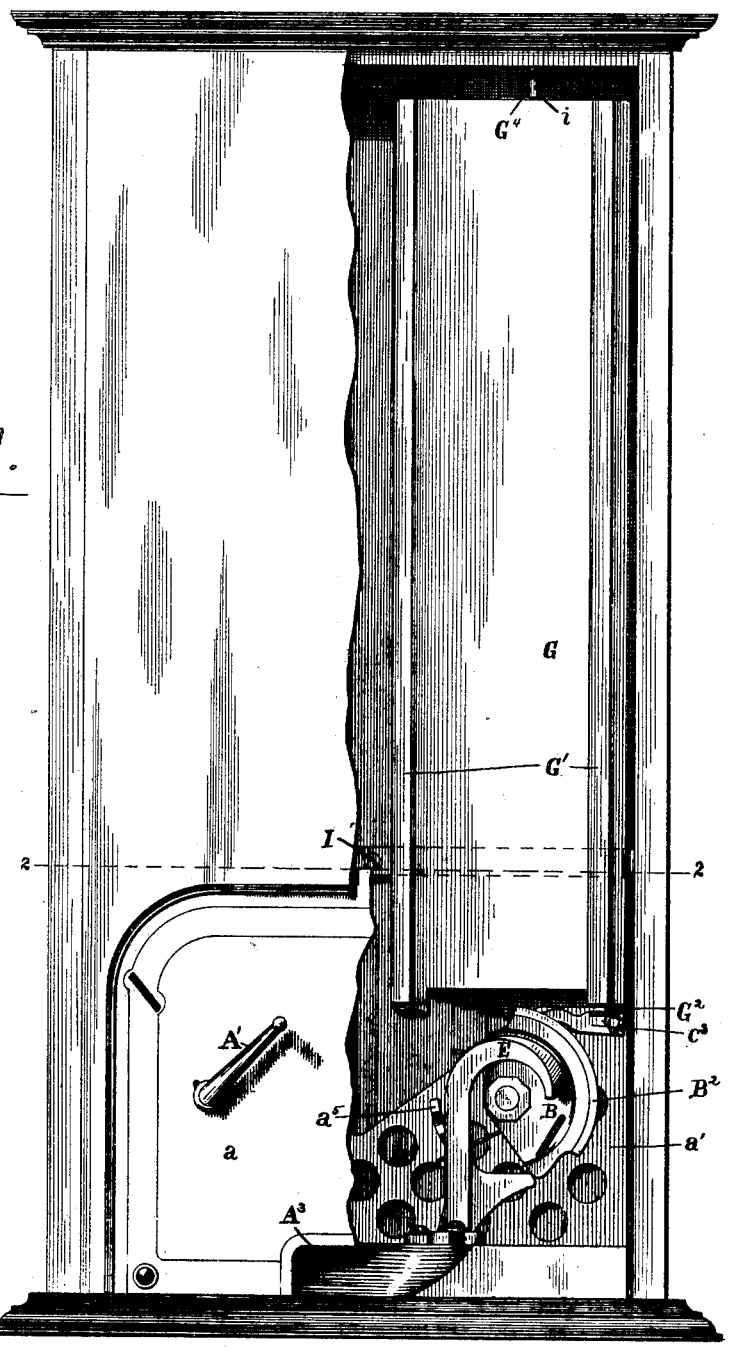
Figure 2:
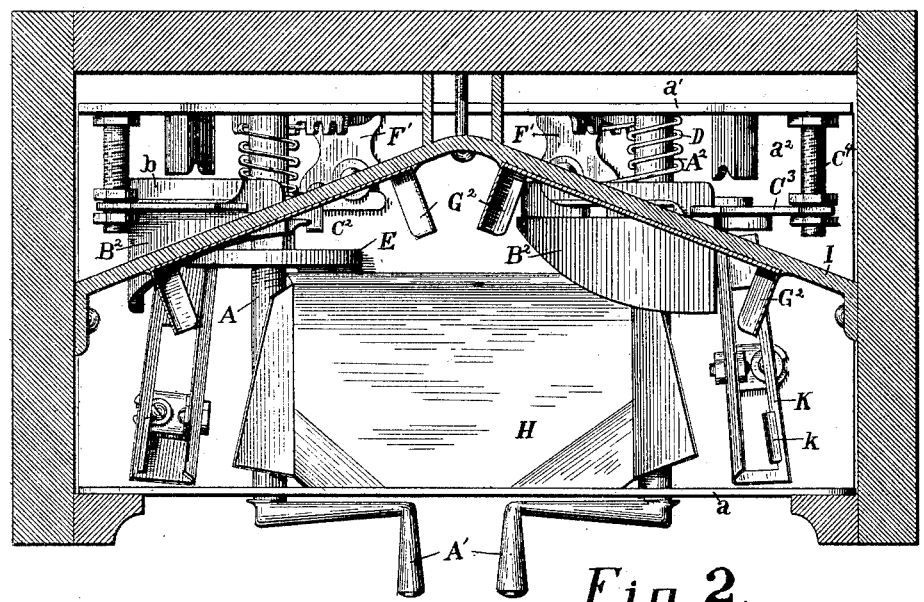
Figure 3:
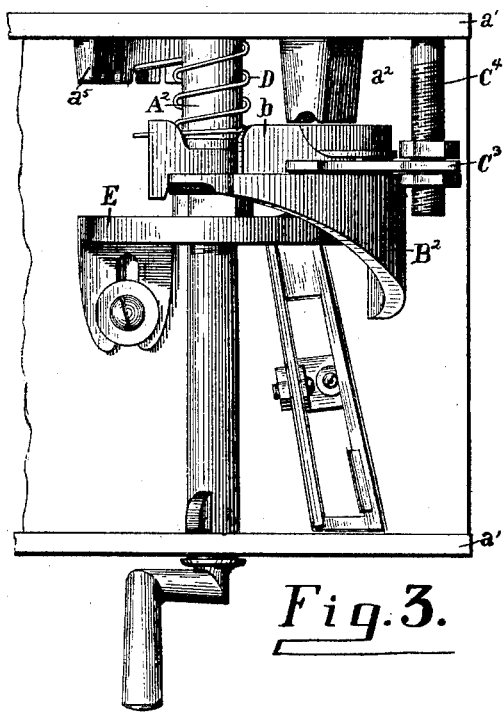
Figure 8:
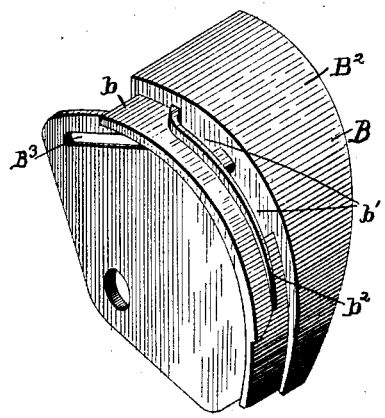
Figure 4:
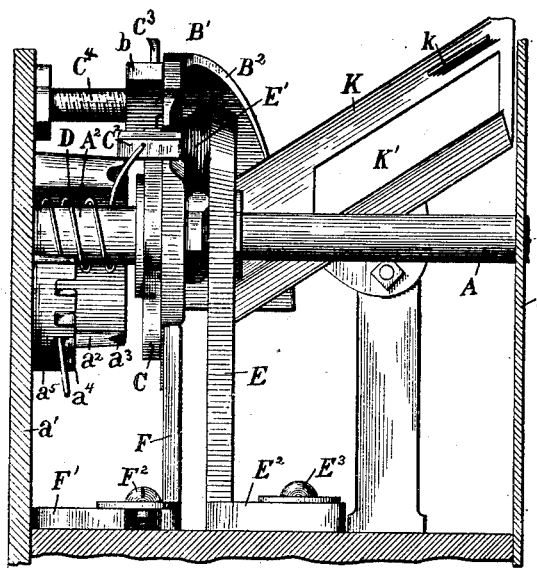
Figure 5:
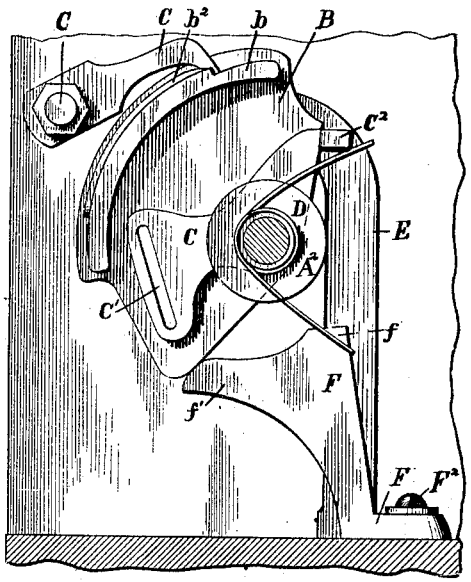
Figure 6:
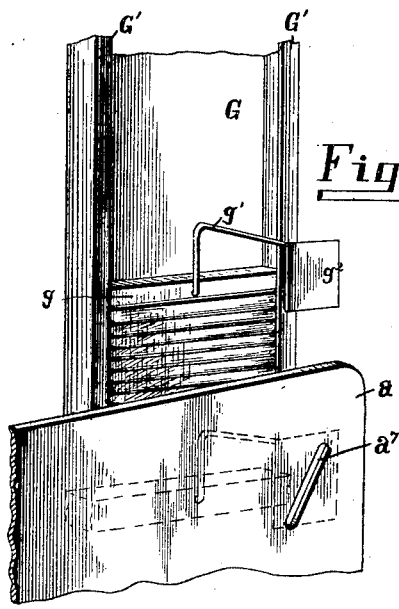
Figure 9:
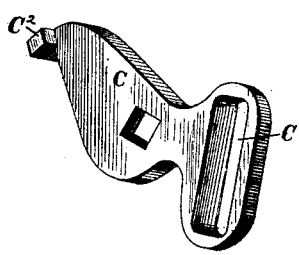

Figure 1 is a front elevation of the machine, showing half the outer casing and cover removed and disclosing one set of the automatic apparatus in vertical elevation. Fig. 2 is an enlarged transverse section on line 2 2, Fig. 1, looking down, one of the cam-plates being in discharging position. Fig. 3 is a top plan view of one of the mechanisms. Fig. 4 is a side elevation of one of said mechanisms looking from the inner or discharge side thereof. Fig. 5 is a rear view thereof, partly broken away. Fig. 6 is a detail perspective view of the holder and the device for closing the coin-slot when the holder is empty. Fig. 7 is a vertical section showing a feed-chute and magnet. Fig. 8 is a detail perspective view of the cam-plate. Fig. 9 is a detail perspective view of the actuating-plate. Fig. 10 is a detail perspective view of the coin-discharger. Fig. 11 is a detail showing a washer or slug attracted by the magnet and in position to drop through a slot in the coin-chute. Fig. 12 is a rear perspective view of a portion of the commodity-holder, showing the upper slotted loop $G^4$.

In the machine shown in the drawings two similar sets of coin-operated apparatus are shown, the only difference being that they are constructed right and left, so that the controlling-shafts are to be rotated in opposite directions. Therefore a description of one will sufficiently explain both, and the same parts, where shown, are indicated by the same letters of reference.

A designates a controlling-shaft, which is suitably journaled in a front plate $a$ of the casing and in a back plate $a'$. This shaft is pivoted at its outer end with a crank-handle $A'$, as shown. On this shaft is loosely mounted a discharger B, which consists of a segment $B'$, provided on its periphery with a curved segmental wedge-shaped flange $B^2$, which is weighted at one end and tapers substantially to a point at the other end. This flange is approximately about the fourth of a circle in length. The discharger on the side opposite the flange $B^2$ is also provided with a narrow flange $b$, upon which rests a dog $C^3$, which is mounted on the end of an arm $C^4$, attached to the back plate and extending beside the discharger, as shown. This dog is adapted to engage any one of a series of notches $b'$ in the flange $b$, so as to prevent the discharger being retracted when once started on its forward or discharging stroke. When the discharger has made a complete stroke, however, the end of the pawl drops behind a shallow rib $b^2$ on the flange $b$, which rib as the discharger is retracted keeps the pawl out of the notches and allows it to pass back into a shallow groove $b^3$, which will direct the dog back into position to engage the notches $b'$, when the discharger is again moved forward. The discharger is also provided with a slot $B^3$ for the entrance of a coin, as hereinafter described, and when the discharger is in normal or retracted position this slot $B^3$ is directly opposite the lower end of the coin-chute, hereinafter described, so that a coin fed in said chute will enter said slot $B^3$ and partially project therethrough, being kept from dropping clear of the discharger, however, by means of a curved coin-arresting lug $a^2$ on the back plate $a'$. As shown, this lug $a^2$ is preferably curved on the arc traversed by the slot $B^3$ when the discharger is rotated, and the inner face of this lug is preferably grooved, as shown at $a^3$, to assist in guiding the coin in its movement with the discharger.

On the shaft A is fixedly mounted a discharger actuating-lever C. This lever has a coin-slot C' on one end, which when the parts are in normal position registers with the slot $B^3$ in the discharger and is interposed between the slot $B^3$ and the coin-arresting lug $a^2$, so that the coin descending the chute will partially project through the slots $B^3$ and C' and will serve as a lock between the actuating-lever and the discharger, so that if the shaft is rotated while the coin is in place the actuating-lever will through the coin impart movement to the discharger. The other end of the actuating-lever is provided with a T-head $C^2$, one end of which abuts against the web of the discharger and the other end is pressed against by one extremity of a coiled spring D, which is supported on a sleeve $A^2$ on shaft A between the actuating-lever and the rear plate, said sleeve serving to keep the actuating-lever in position. The other end of this spring D may be engaged with any one of a series of notches $a^4$ on a curved rib $a^5$ on the rear plate, as shown, so as to impart sufficient tension to the spring to cause it to return the actuating-lever, the shaft, and the discharger to normal position when the handle A' is released.

At the side of the discharger opposite the actuating-lever is a coin-ejector E, which is provided with a beveled head E', preferably grooved on its inner surface and adapted to project into the path of the coin carried by the actuating and discharger lever after the coin has been raised clear of the arrester $a^2$, so that the coin will be forced out of said slots, and thus disconnect the discharger and actuating lever. This ejector E may be of the form indicated in Fig. 10 and provided with a slotted base $E^2$, by which it can be adjustably secured in position by screw $E^3$. It is not intended to give a complete rotary movement to the shaft A and connected parts, and the proper extent of movement is limited by the stop-plate F, which is provided with a slotted base F', by which it can be adjustably secured in position by a screw $F^2$. This stop-plate is provided with a stop portion $f$, which is adapted to be struck by the head $C^2$ of the actuating-lever when the parts are moved to discharge commodities and limits the proper forward movement of the discharger, and the return movement of the parts is limited by a stop portion $f'$ on said plate, against which the rear edge of the discharger abuts when it stands in normal position.

Suspended over and directly above the discharging-plate is a commodity-holder G, which is adapted to contain a series of packages of the commodities to be sold and is of ordinary construction, having retaining-flanges G' on its side and $G^2$ on its bottom; but the side flanges G' terminate a sufficient distance above the bottom flanges $G^2$ to enable the lowermost package to be ejected laterally from the holder. This lateral discharge of the lowermost package is accomplished by the discharger B, the point of the discharging-flange $B^2$ lying just behind the edge of the lowermost package when the parts are in proper position, and when the shaft A is turned and the discharger is operated the beveled edge of the discharging-flange acts like a cam against the rear edge of the lowermost package and forces the latter laterally out of the holder and into a chute H, by which it is led to the discharge-opening $A^3$ in the front of the casing.

A weight or follower $g$ is placed in the holder above the packages of commodities and descends as the latter are discharged. A small plate $g^2$ is connected to the follower by means of a rod $g'$, this plate and rod being so adjusted relatively to the follower that when the commodities are discharged the follower descends to the end of the holder the plate $g^2$ will close the coin-slot $a^7$ in the front of the casing, so that no intending purchaser will be cheated by depositing a coin in the machine after the supply of commodities is exhausted. The holders are removably supported by means of rear loops $G^3$ on brackets I, attached to and secured within the casing above the discharging devices, and the holders also have an upper slotted loop $G^4$ engaging screw $i$ in the top of the casing.

The coins are directed into the slots $B^3$ and C' of the discharger B and actuating-lever C, preferably by means of the chutes K, illustrated in the drawings. Each chute is preferably formed of copper and is laterally inclined, and near its receiving end the back of the chute is cut away for part of the length thereof, forming a slot K', which is almost as wide as the diameter of the proper coins which are adapted to operate the machine, leaving only a very shallow coin-guiding groove $K^2$ at the bottom of the slot. Above this slot and near the receiving end of the chute is preferably secured a laterally-projecting copper plate $k$, which extends partially over the slot K', and just above this plate $k$ is the pole of a suspended magnet of any suitable construction. As shown, a flat magnet $k'$ is suspended thereover by a bracket $k^3$. The object of this construction is to prevent cheating the machine by inserting iron washers or slugs in place of the coins, or if a washer be introduced into the chute the attraction of the magnet will draw it upward, so that its lower end will slip out of the narrow guide-groove $K^2$, and it will swing clear of the groove and drop through the slot into the bottom of the casing, this action being indicated in Fig. 11. The magnet will have no effect on coins, which will descend through the chute and pass partly through the slots $B^3$ and $C'$ in the discharger and actuating-lever, respectively, until it is arrested by the arrester $a^2$. Then the purchaser depresses the handle $A'$ in the direction indicated by the arrow on the casing, which rocks the shaft and actuating-lever, and as the coins make the discharger temporarily fast to the lever the discharger is also rotated with the lever until the coin is raised clear of the stop $a^3$, whereupon the coin strikes the ejector E and is forced sufficiently out of the slot in the discharger to allow it to drop by gravity clear of the actuating parts. This movement of the discharger causes the ejection of the package by the action of its cam-flange against the lowermost package in the holder, as above described. The parts are then returned to normal position by the spring until another coin is fed into the machine, when the operation may be repeated.

Having thus described our invention, what we therefore claim as new is—

1. In an automatic vending-machine, the combination of a discharger provided with a coin-slot, an actuating-lever provided with a coin-slot, means for directing a coin into said slots so that when registering the discharger will be locked to the actuating-lever, and means for ejecting a coin from the slots when the discharger has been properly operated and for returning the parts to normal position, substantially as described.

2. The combination of a commodity-holder, a discharger below the same adapted to eject articles singly therefrom and provided with a coin-slot, a coin-arresting device at one side of the discharger and a coin-feeding chute at the other side thereof; with an actuating-lever interposed between the discharger and coin-arresting device and provided with a coin-slot adapted to register with the slot in the discharger, means for freeing the coin from the slots of the discharger and receiver after the discharger is actuated, and means for returning the parts to normal position, substantially as described.

3. In an automatic vending-machine, the combination of a shaft, an actuating-lever thereon provided with a coin-slot, a discharger beside the actuating-lever having a coin-slot adapted to register with that of the lever, a coin-arresting device in rear of the lever, and a coin-feed device in front of the discharger, and an ejector beside the discharger adapted to force the coin from the slots of the discharger and lever and thus free the one from the other, and means for returning the parts to normal position, substantially as described.

4. In an automatic vending-machine, the combination of a shaft, an actuating-lever thereon provided with a coin-slot, a discharger loosely mounted on the shaft beside the actuating-lever having a coin-slot adapted to register with that of the lever, a coin-feeding device in front of the discharger, and means for returning the parts to normal position; with a dog adapted to engage the discharger and prevent the return thereof after a partial forward movement until it has made its complete stroke, substantially as described.

5. In an automatic vending-machine, the combination of an oscillatory shaft, an actuating-lever thereon, provided with a coin-slot, a discharger loosely mounted on the shaft beside the actuating-lever having a coin-slot adapted to register with that of the lever, a coin-arresting device in rear of the lever, a coin-feeding device in front of the discharger, an ejector beside the discharger adapted to force the coin from the slots of the discharger and lever and thus free the one from the other, and means for returning the parts to normal position; with a dog adapted to engage the discharger and prevent the return thereof after a partial forward movement until it has made its complete stroke, and a stop for limiting the movement of the discharger and lever, for the purpose and substantially as described.

6. The combination of the commodity-holder, the oscillatory discharger below said holder having a segmental peripherally-wedge-shaped projection adapted to eject packages from the holder laterally when the discharger is operated and coin-controlled devices for actuating the discharger, substantially as described.

7. The combination of the commodity-holder, the oscillatory discharger below said holder having a segmental and circumferentially-wedge-shaped flange adapted to eject the packages from the holder laterally when the discharger is oscillated, and coin-controlled means for actuating said discharger, substantially as described.

8. The combination of the commodity-holder, the discharger below said holder having a wedge-shaped flange adapted to eject the packages from the holder laterally, and means for actuating said discharger; with a movable lever adapted to engage the discharger and return it to normal position; said discharger and lever having registering coin-slots, and means for introducing a coin into said slots so as to lock the two together, and means for ejecting the coin from the slots, after the discharger is operated, substantially as described.

9. The combination of the commodity-holder, the oscillatory discharger below said holder having a segmental wedge-shaped flange adapted to eject the package from the holder laterally when the discharger is oscillated, and means for actuating said discharger; with a rocking shaft upon which the discharger is loosely mounted, a lever fixed on said shaft, a spring for returning said lever to normal position, said lever being provided with a lug adapted to engage the discharger and return it to normal position and said discharger and lever being formed with registering coin-slots, means for introducing a coin into said slots so as to lock the two together, and means for ejecting the coin from the slots after the discharger is operated, substantially as described.

10. The combination of a segmental discharger having a series of notches and a dog engaging said notches to prevent the return of the discharger before it has made a complete stroke, said discharger being provided with a guard-rib whereby the dog is kept out of the notches after the discharger has made a complete stroke and during the return of the discharger to normal position and coin-controlled devices for actuating the discharger, substantially as described.

11. The combination with a segmental discharger having a series of notches and a dog engaging said notches to prevent the return of the discharger before it has made a complete stroke, said discharger being provided with a guard-rib whereby the dog is kept out of the notches after the discharger has made a complete stroke and during the return of the discharger to normal position; with the rock-shaft upon which the discharger is loosely mounted, an actuating-lever on said rock-shaft, said lever and discharger having registering coin-slots, means for fitting the coin into said slot so as to lock these parts together, and means for ejecting the coins from the slots when the discharger has been properly actuated, and a spring for returning the parts to normal position, substantially as described.

12. The combination of the discharger provided with a wedge-shaped flange and with a notched locking-flange, said locking-flange being provided with a shallow rib to prevent engagement of a dog with the notches during the complete return stroke of the discharger, and a dog adapted to engage said notches during the forward stroke of the discharger; an actuating-lever beside said discharger adapted to return the discharger to normal position, said lever and discharger having registering coin-slots, means for feeding the coin to said registering slots, and means for displacing said coin in the slots, substantially as described.

13. The combination of the rock-shaft, a discharger loosely mounted thereon provided with a wedge-shaped segmental flange and with a notched locking-flange, said locking-flange being provided with a shallow rib to prevent engagement of a dog with the notches during the complete return stroke of the discharger, and a dog adapted to engage said notches during the forward stroke of the discharger, an actuating-lever fixed on said shaft beside said discharger adapted to return the discharger to normal position, said lever and discharger having registering coin-slots whereby when a coin is inserted therein these members are locked together, a coin-arrester in rear of the actuating-lever, a chute for directing a coin into said registering slots, and an ejector for displacing said coin in the slots so as to release the lever from the discharger when the latter has completed its stroke, substantially as described.

In testimony that we claim the foregoing as our own we affix our signatures in presence of two witnesses.

GEO. L. SLATER.
ARTHUR W. ROE.

In presence of—
JAMES DUSHANE,
F. G. LEWIS.